United States Patent [19]

Lebizay et al.

[11] Patent Number: 4,817,094
[45] Date of Patent: Mar. 28, 1989

[54] FAULT TOLERANT SWITCH WITH SELECTABLE OPERATING MODES

[75] Inventors: Gerald Lebizay, Vence, France; Yeong-Chang Lien, Briarcliff Manor; Michael M. Taso, Yorktown Heights, both of N.Y.

[73] Assignee: International Business Machines Corporation, Armonk, N.Y.

[21] Appl. No.: 948,372

[22] Filed: Dec. 31, 1986

[51] Int. Cl.⁴ .............................................. G06F 11/08
[52] U.S. Cl. .......................................... 371/36; 371/68
[58] Field of Search .......................... 371/36, 8, 68, 69

[56] References Cited

U.S. PATENT DOCUMENTS

| | | | |
|---|---|---|---|
| 3,760,371 | 9/1973 | Pitroda et al. | 371/69 X |
| 4,225,961 | 9/1980 | Raggenbass et al. | 371/36 |
| 4,276,645 | 6/1981 | Lager et al. | 371/36 |
| 4,484,330 | 11/1984 | Moy | 371/36 |
| 4,551,842 | 11/1985 | Segarra | 371/69 |
| 4,606,029 | 8/1986 | Nagao et al. | 371/69 |
| 4,621,368 | 11/1986 | Onoe et al. | 371/69 |
| 4,670,880 | 6/1987 | Jitsukawa et al. | 371/36 |

Primary Examiner—Charles E. Atkinson
Attorney, Agent, or Firm—Douglas W. Cameron

[57] ABSTRACT

A method for providing fault tolerant transmission of electrical signals through a transmission device. A number of redundant signals are transmitted through a transmission device, wherein the number of redundant signals per original signal varies dynamically in accordance with selected conditions. These selected conditions are typical of whether the transmission device, typically a switching network, are in normal or overflow operation. Putatively identical signals at corresponding outputs of the transmission device are then compared and at least one correct output signal is generated therefrom.

4 Claims, 5 Drawing Sheets

INPUT MULTIPLEXING UNIT

FAULT TOLERANT SWITCH WITH SELECTABLE OPERATING MODES

DESCRIPTION

Technical Field

This invention relates to an apparatus and a method for providing fault tolerant transmission of electrical signals. More specifically, a number of redundant signals are transmitted through a transmission device. This number dynamically varies in accordance with selected conditions. Putatively identical signals at corresponding outputs of the transmission device are then compared, and at least one correct signal is generated.

BACKGROUND OF THE INVENTION

A conventional method of providing for fault tolerant transmission through a transmission device is through the use of standby facilities which are not in use during no fault conditions, that is, during normal operation. More specifically, U.S. Pat. No. 4,497,054 to Read employs a standby digital switch which can be substituted for any one of a plurality of primary switch elements. During normal operation the standby digital switch remains idle.

Another conventional method of providing for fault tolerance through a transmission device is through the use of standby facilities which are used for the transmission of data under normal operations. More specifically, in U.S. Pat. No 4,455,645 to Mijioka et al, PCM signals are sent out on active and standby lines to a pair of switching modules. The active PCM line and the corresponding standby PCM line are never connected to the same switching module. When one of the switching modules fails, standby lines are then used to shift traffic to other working switching modules. The output active and standby lines, however, are not compared to each other for the detection on an erroneous output signal.

U.S. Pat. No. 3,920,914 to Regnier et al provides fault tolerance by providing multiple paths for a communication with each path going through a different and redundant switch. If during normal operation one of the paths is found inoperative, another path through the switch can be used. The signals on the output of each path, however, are not compared to each other for the detection of erroneous signals.

U.S. Pat. No. 4,276,637 to Le Dieu presents a design of a TDM switch with the feature wherein, when any one input module (terminal module in FIG. 2) fails, the traffic coming to the input module can still be properly switched through the switch. The approach proposed is to partition replicated traffic into other input modules. A so called management center will control the selection of the active path. Basically, Le Dieu's patent deals with the provision of the multiple paths, but it has nothing to do with the fault detection or correction using redundant paths.

SUMMARY OF THE INVENTION

It is, therefore, an object of this invention to provide efficient and reliable fault tolerant transmission of electrical signals through a transmission device. Efficiency is improved by dynamically varying the number of redundant signals, and reliability is increased by comparing putatively identical signals at the outputs of the transmission device.

Accordingly, this invention provides a fault tolerant method of transmitting electrical signals through a transmission device. This method provides a number of redundant signals which are copies of an original signal to be transmitted through the transmission device. This number dynamically varies in accordance with selected conditions. The redundant signals and the original signal are then transmitted through the transmission device. Finally, putatively identical signals at corresponding outputs of the transmission device are compared. The number of putatively identical signals at the outputs of the transmission device is equal to one plus the number of redundant signals transmitted through the transmission device as described above. Finally, the correct output signal is generated from the putatively identical signals at the outputs of the transmission device.

This invention also includes a watchdog circuit to provide fault tolerant transmission of electrical signals. This circuit has a means, responsive to a control signal, for comparing sets of putatively identical signals. Each set has an original signal and a number of copies of that original signal. The number of copies of the original signal dynamically varies in accordance with selected conditions. The watchdog circuit also has a means for generating at least one correct output signal for each set of putatively identical signals.

DESCRIPTION OF THE PREFERRED EMBODIMENT

Figure 1:
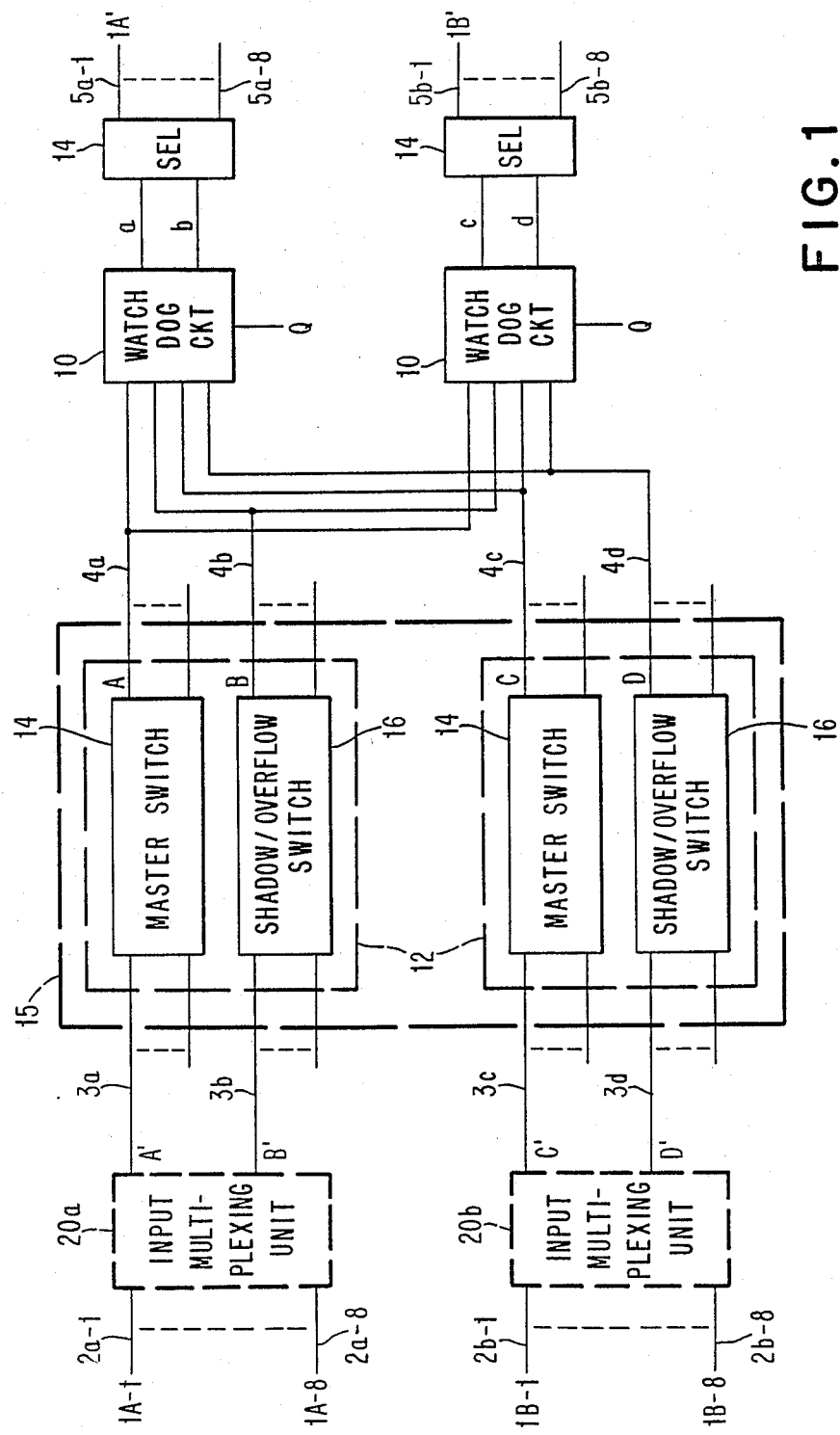
FIG. 1 is a schematic illustration of the apparatus used to implement this invention. This illustration includes the watchdog circuit and the transmission device.

Referring now to the drawings, and more particularly to FIG. 1, there is shown a schematic illustration of the apparatus used to implement this invention. Under normal operation, to be described below, an original signal A' and redundant signals B', C' and D' are provided on the inputs 3a, 3b, 3c and 3d, respectively, of transmission-device 15. The redundant signals are copies of tee original signal. The original and redundant signals are transmitted through transmission device 15, and as a result, there are four putatively identical signals A, B, C and D at corresponding outputs 4a, 4b, 4c and 4d, respectively, of transmission device 15. The putatively identical signals A, B, C and D, are then compared by watchdog circuits 10 and four identically correct output signals a, b, c and d, are generated on the outputs of the watchdog circuit.

In this embodiment and under normal conditions (see below), original signal A' and redundant signals B', C' and D' are provided from two redundant groups of 8 4-megabit signals 1A-1 through 1A-8 and IB-1 and 1B-8. The signals 1A-1 through 1A-8 and signals 1B-1 through 1B-8 are multiplexed through input multiplexing units 20a and 20b respectively. At the outputs 3a and 3b of the input multiplexing unit 20a there i-s an original signal A' and a signal B' which is a redundant signal of A'. A' is a 32 megabit signal provided as a result of multiplexing signals 1A-1 through 1A-8. Since signals 1B-1 through 1B-8 are just a copy of signals 1A-1 through 1A-8 respectively. C' and D' are just redundant signals being the same as signal A'. Thus, in this embodiment, we have an original 32 megabit signal A' and three redundant signals B', C' and D'. Each redundant signal is merely the same signal as A'.

Figure 2:
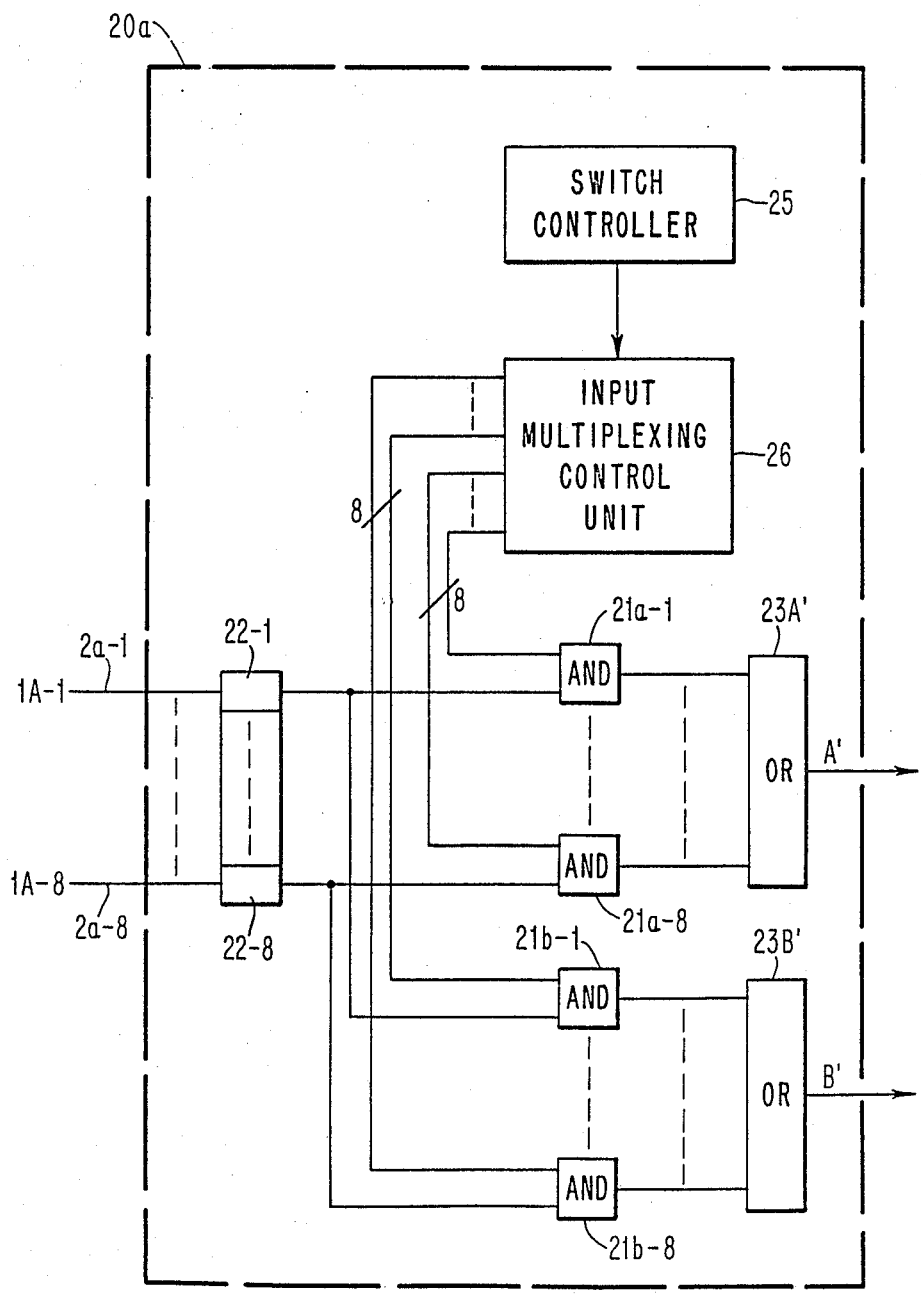
FIG. 2 a schematic illustration of the input multiplexor unit.

Referring now to FIG. 2, the provision of original signal A' and the redundant signal B' will be described in further detail. One bit from each of the digital signals 1A-1 through 1A-8 are stored in parallel, though asynchronously, through lines 2a-1 through 2a-8 into input buffer 22, into respective slots 22-1 through 22-8 of the buffer 22, approximately every 250 nanoseconds. Under the control of switch controller 25 and input multiplexing control unit 26, control signals are applied approximately every 30 nanoseconds to appropriate AND gates to provide one original 32 megabit signal A' and a redundant signal B' which is the same as signal A'. The operation of input multiplexing unit 20b (see FIG. 1) is the same as 20a and the redundant signals C' and D' are the same as signals A' and B'. The description in this paragraph, however, applies to normal operation. As will be explained further below, normal operation implies that there is no overflow as a result of blocking in the transmission device 15, more specifically switching network 15.

The redundant paths which are provided for B' and D' signals are optional and could be used for different purposes such as for increasing switch bandwidth in switch blocking situations.

To prevent a potential blocking situation, wherein a path cannot be found from an input line such as 3a to an output line such as 4a, the switching network will go into an overflow condition. In this condition A' and B' are no longer the same signals, and B' now becomes an overflow signal. Referring to FIG. 2 in the overflow condition, the switch controller 25 through control unit 26, place signals on an appropriate pair of AND gates during a given time slot. One AND gate is from AND gates 21a-1 through 21a-8, and the other AND gate is from 21b-1 through 21b-8. Thus, during the given time slot, an original bit or signal from a first slot of buffer 22 and another signal (overflow) bit or signal from a second slot of buffer 22 is sent through OR gates 23A' and 23B' respectively. However, C' and D' would just be redundant signals of original signals A' and B' respectively.

Returning now to FIG. 1, transmission device 15, or more specifically switching network 15 will now be described. The switching network 15 includes two switching devices 12, with one device being merely a copy of the other device. Each switching device includes a master switch 14 and a shadow/overflow switch 16. Under normal conditions the master switch and the shadow/overflow switch will switch duplicate signals such as A' and B'. In the overflow condition, the master switch will switch an original signal such as A' on line 3a, and the shadow/overflow switch will switch a signal such as B' on line 3b, but B' will now be an overflow signal not a redundant version of A'. While only one input signal is show, it should be noted that both the master switch and shadow/overflow switch have a number of signals and a number on a number of inputs. For simplicity of illustration, only signal A' and B' on inputs 3a and 3b respectively are shown. Under normal conditions the signals at the inputs of the master switch are the same signals at corresponding inputs of the shadow/overflow switch.

The method of this invention, as well as the watchdog circuit, will be useful when the switching network is a digital switching network where the outputs are the output signals a, b, c and d are digital signals. This invention will also be particularly useful when used with the bit switch which is described in an earlier filed application. This pending application entitled, "A Crosspoint Digital Switch for Communication", Serial No. 06/896,771, was filed on Aug. 15, 1986 and is herein incorporated by reference. This pending application, like the present application, is also to be assigned to IBM.

Figure 3:
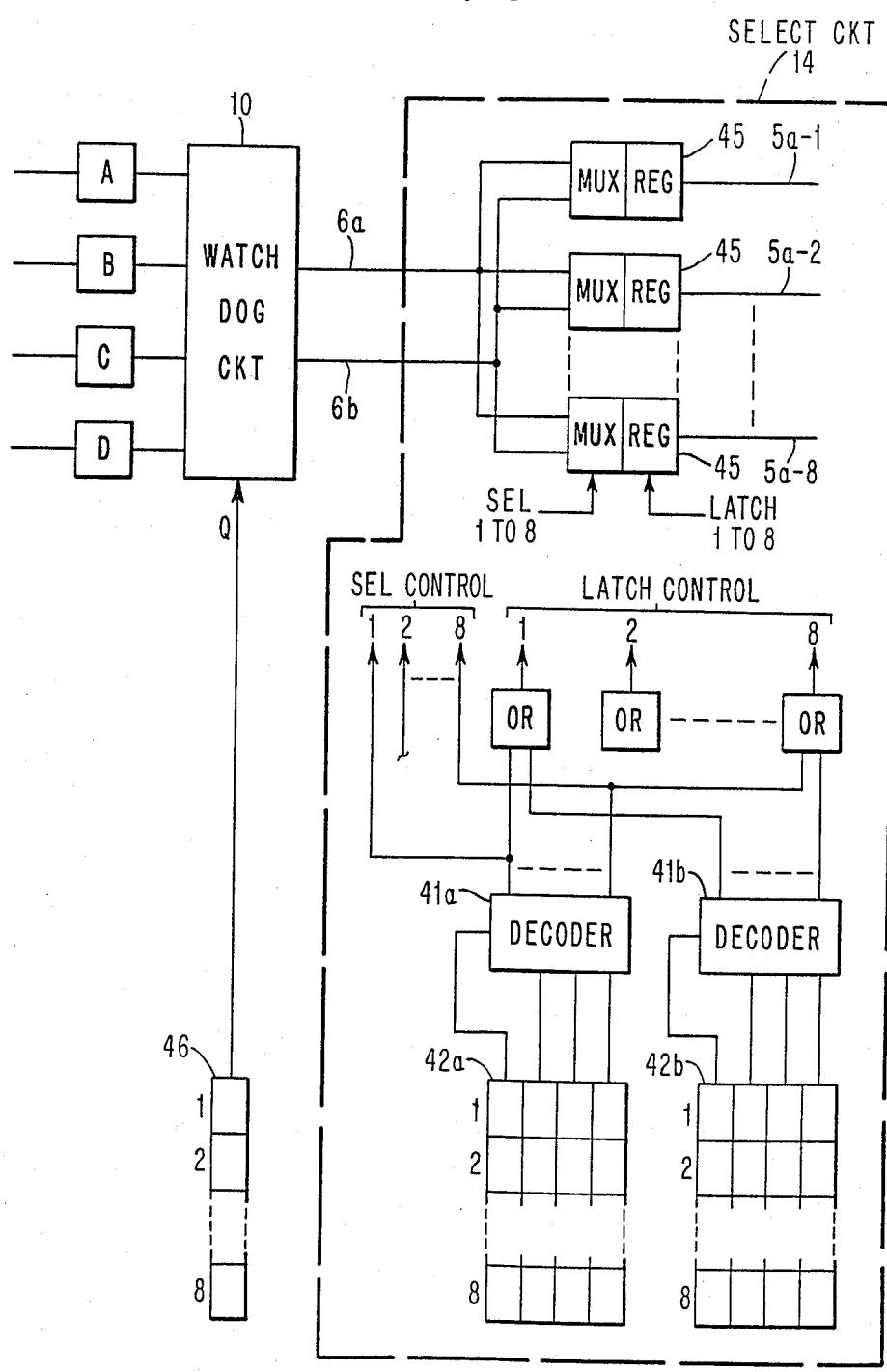
FIG. 3 is a schematic illustration showing how the select circuit and watchdog circuit cooperate with each other.

Referring now to FIG. 3, there is shown a schematic illustration of the watchdog circuit 10 and a select circuit 14. Shown also in FIG. 3 is an 8×1 register 46 which supplies the control signal to enable the watchdog circuit to compare a set of putatively identical signals. In this embodiment where $Q=0$, signals A and C are compared with each other and the signals B and D are compared with each other. When $Q=0$, the set of signals A and C form a set of putatively identical signals, and the set of signals B and D also form another set of putatively identical signals. When $Q=0$ the network is in overflow operation. When $Q=1$, all the signals in the set of putatively identical signals A, B, C and D are compared with each other, and the switching network is said to be in normal operation.

Again referring to FIG. 3, there is shown a schematic illustration of the select circuit 14 (see FIG. 1) interconnected to watchdog circuit 10 via lines 6a and 6b. The select circuit 14 is used to demultiplex and place the correct output signals a and b on appropriate output lines 5a-1 through 5a-8. The basic operation of the select circuit is controlled by the selection control and latch control signals from decoders 41a and 41b respectively. For each bit cycle of operation of the select circuit, the select control signal puts the 'a' bit, or signal, on line 6a onto the input of one of the registers 45. The 'b' bit, or signal, on line 6b is placed on the input of the remaining seven registers. The latch control signal is used to decide which of the bits placed on the inputs of the register will be latched into the respective registers and ultimately placed on output lines such as 5a-1 through 5a-8. During normal operation one and only one register will latch in the 'a' bit. Under overflow conditions an additional register will be selected to latch in the 'b' bit. Information to operate the selection and latch control signals is stored in two sets of 8×4 registers 42a and 42b. Three bits are used to encode which one of the eight latch signals will latch a bit into the respective register. The fourth bit, the enable bit controls whether any bit will be latched at all. The switch controller 25 will schedule channels to use the switch, detect the overflow of the switch, and load registers 42a, 42b and 46 accordingly.

Figure 4A:
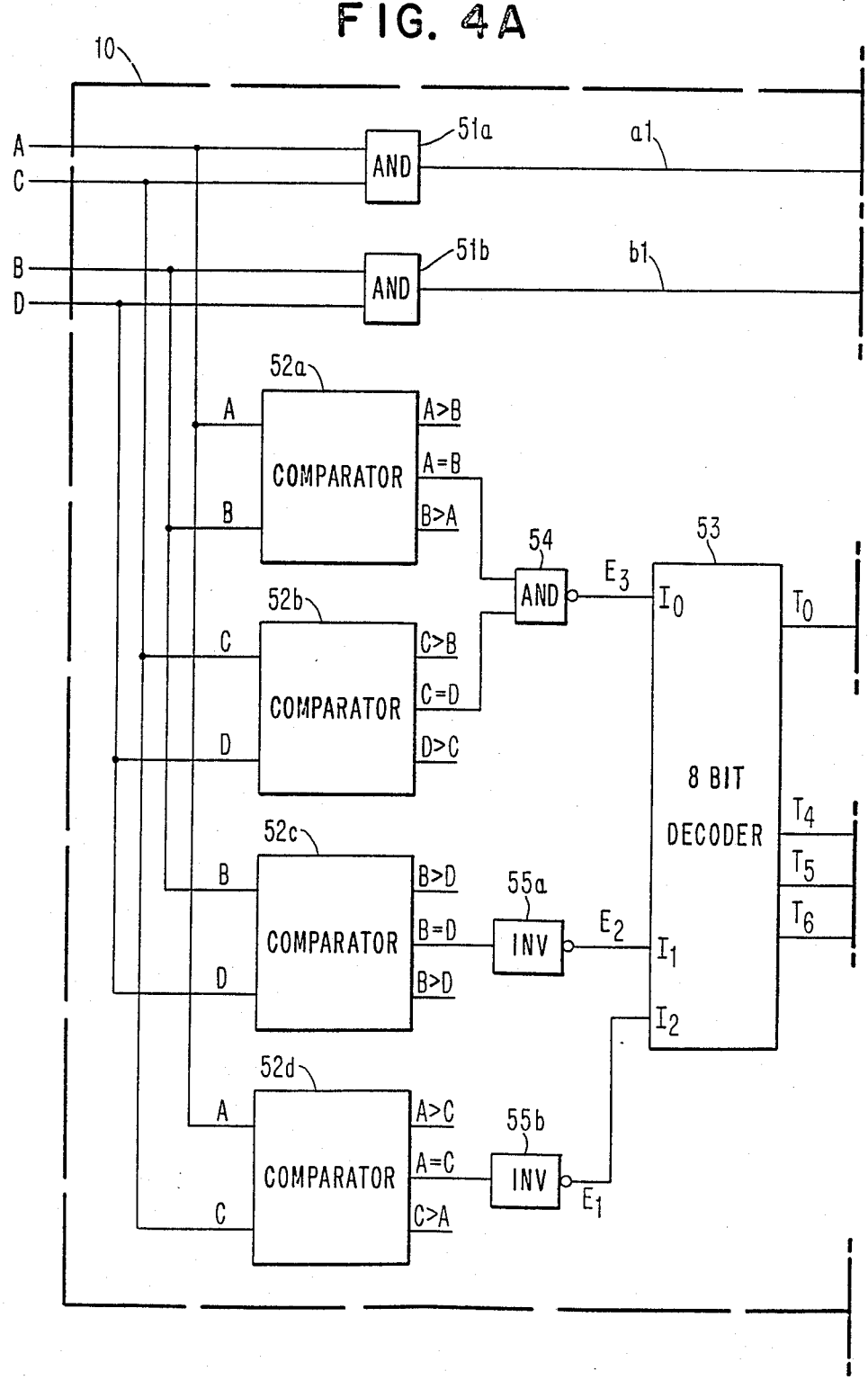
FIG. 4, comprised of FIGS. 4A and 4B, is more detailed illustration of the watchdog circuit.
Figure 4B:
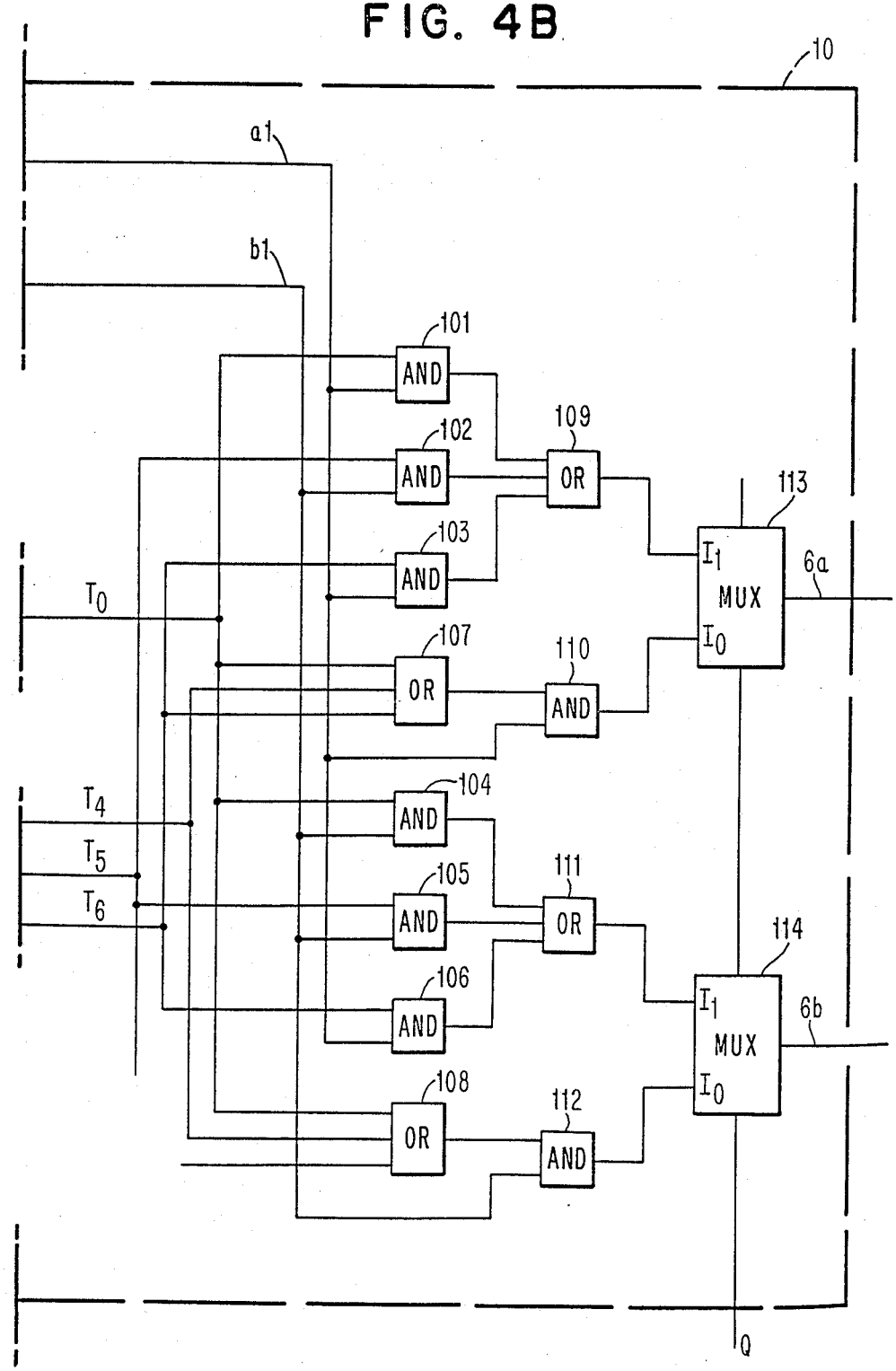

Referring now to FIG. 4, there is shown a more detailed schematic of the watchdog circuit 10 of FIGS. 1 and 3. In this embodiment, the watchdog circuit takes in four input signals A, B, C and D, and generates correct output signals a and/or b. These input signals to the watchdog circuit form the set/sets of putatively identical signals, that is/are compared by the watchdog circuit. As described above, control signal Q is used to enable the watchdog circuit to compare either one set of four signals ($Q=1$) or two sets of two signals ($Q=0$).

Signal al is the result of inputting signals A and C to AND gate 51a and signal b1 is the result of inputting signals B and D to AND gate 51b. The signals E1, E2 and E3 are used to indicate error conditions. When E1=1, the error condition of A not equal to C is indicated. When A does not equal C, the output of comparative circuit 52d is 0, and this 0 is applied to the inverter circuit 55b whose output is applied to bit decoder 53 at input $I_2$. Signal E2, on the other hand, is used to indicate the error condition of B not equal to D. When B is not equal to D, the output of comparative circuit 52c is 0. This 0 is then is applied to inverter circuit 55a whose output is applied to inverter circuit 53 at input $I_1$. E3, however, is used to indicate an error condition wherein all the signals A, B, C and D should be equal under normal operation. These four signals are compared through comparator circuits 52a and 52b. The outputs of the comparator circuits 52a and 52b are then applied to NAND gate 54 whose output is applied to bit decoder 53 at input $I_0$.

From the above description of FIG. 4, one skilled in art would recognize that the circuit of FIG. 4 effects the following logic equations:

$$a1 = (A\ C)$$

$$b1 = (B\ D)$$

$$E1 = \text{not}\ (A = C)$$

$$E2 = \text{not}\ (B = D)$$

$$E3 = \text{not}\ (A = B = C = D).$$

The signals a1, b1, and Q, along with signals from the outputs of the bit decoder 53 are applied to logic gates 101 through 112 as shown in FIG. 4 to yield the Truth Table as shown below. As an example, if E3=E2=E1=0, then a 1 will appear on the output $T_0$ of bit decoder 53. This 1 will then appear on the inputs of AND gate 101 and 104, and OR gates 107 and 108. A 1 will then appear as an input on OR gate 109 and at the output of the same OR gate since the outputs of AND gates 102 and 103 will be 0 since T5 and T6 are 0. Because Q1=1, the signal on input $I_1$ (which is a 1) of multiplexor 113 will appear on line 6a. Thus, the signal a will be a1. By the same analysis as in the above, the signal on line 6b will be b1, that is, b1 will appear on input $I_1$ of the multiplexor 114. Since Q1=1, the signal at the input I1 of the multiplexor 114 will appear on output line 6b. In the watchdog circuit, Q is used as a select control signal for multiplexors 113 and 114. By a similar analysis known to those skilled in the art, the following Truth Table is realized through the circuit shown in FIG. 4:

Truth Table:
Input: Q, E1, E2, E3, a1, b1
Output: a, b

|    |    |    | Q = 1 |   | Q = 0 |   |
| E3 | E2 | E1 | b  | a  | b  | a  |
|----|----|----|----|----|----|----|
| 0  | 0  | 0  | b1 | a1 | b1 | a1 |
| 1  | 0  | 0  | 0  | 0  | b1 | a1 |
| 1  | 0  | 1  | b1 | b1 | b1 | 0  |
| 1  | 1  | 0  | a1 | a1 | 0  | a1 |
| 1  | 1  | 1  | 0  | 0  | 0  | 0  |

Notice when there are two sets (Q=0) identical signals (A=C and B=D), a correct signal a1 or b1 will be generated only if the corresponding set has two identical signals. That is, a1 is generated only if A=C (E1=0), and b1 is generated only if B=D (E2=0). Notice also that when there is one set (Q=1) of four putatively identical signals, a correct signal a1 and/or b1 is generated only if at least two signals in the corresponding set are identical. However, two signals in the set of signals A, B, C, D, could be equal without a correct signal being generated. For example, suppose B=C but A≠D. Then, E3=E2=E1=1, but no correct signal is generated. Thus, we can see that a correct output signal is generated only if selected subsets of the set (A, B, C, D) are identical. That is, a correct output is generated only if A=C or B=D.

Having thus described our invention, when we claim as new, and desire by Letters Patent is:

1. A fault tolerant method of transmitting an electrical signal, comprising the steps of:
   (a) providing a number of redundant signals which are copies of an original signal to be transmitted through a transmission device, with said number of redundant signals, dynamically varying in accordance with selected conditions, said conditions being selected from the group of conditions consisting of normal operation and overflow operation of the transmission device;
   (b) transmitting the redundant signals and the original signal through the transmission device;
   (c) comparing simultaneously putatively identical signals at corresponding outputs of the transmission device with the number of putatively identical signals being equal to one plus the number of redundant signals in step (a); and
   (d) generating at least one correct output signal from the putatively identical signals if at least one subset of a plurality of selected subsets of the putatively identical signals compared in step (c) are identical.

2. A fault tolerant method of switching electrical signals through a switching network, comprising the steps of:
   (a) providing, for each particular original signal to be switched, a number of redundant signals which are copies of the particular original signal, at corresponding inputs to the switching network, the number of redundant signals per original signal varying in accordance with whether the switching network is in normal operation or is in overflow operation;
   (b) switching each original signal and its number of redundant signals through the network;
   (c) comparing simultaneously each set of putatively identical signals at corresponding outputs of the switching network with each other in the same set, with the number of putatively identical signals in each set being equal to one plus the number of redundant signals in step (a);
   (d) generating at least one correct output signal from each said set of putatively identical signals in which at least one subset of a plurality of selected subsets of putatively identical signals were found to be identical when compared in step (c).

3. In a digital switching network having a number of digital switches, a method of providing fault tolerant switching of digital signals through the network, comprising the steps of:
   (a) providing a number of redundant bits for each original bit of an original digital signal to be transmitted, with the number of redundant bits per original bit of the original signal dynamically varying with each original bit of the original signal that is transmitted, with the number varying in accordance with whether the network is in normal operation or is in overflow operation;

(b) switching in parallel each original bit and its number of redundant bits through the network, each original bit and its number of redundant bits forming a set of putatively identical signals for each original bit;

(c) comparing putatively identical bits at corresponding outputs of the network, with the number of putatively identical bits in each set of putatively identical signals being equal to one plus the number of redundant bits in step (a); and (d) generating, for each set of putatively identical signals, at least one correct output signal from each set of putatively identical bits compared in step (c) in which at least one subset of a plurality of selected subsets of the respective set of putatively identical bits are identical.

4. A watchdog circuit, comprising:

(a) comparison means, responsive to a control signal, for simultaneously comparing a number of signals in each of a set of putatively identical signals, each said set having an original signal and a plurality of copies thereof, the number of copies of each said original signal and the number of sets of signals dynamically varying from set to set in accordance with selected conditions indicated by said control signal; and (b) means, responsive to signals from said comparison means in step (a), for generating at least one correct output signal for each set of putatively identical signals in which at least one subset of a plurality of selected subsets of putatively identical signals were found to be identical when compared in step (a).

* * * * *